United States Patent [19]

Byers

[11] Patent Number: 4,789,118
[45] Date of Patent: Dec. 6, 1988

[54] PAD APPARATUS FOR SUPPORTING A PAYLOAD IN A CRADLE APPARATUS OF A SPACE VEHICLE

[75] Inventor: Frank L. Byers, Littleton, Colo.

[73] Assignee: Orbital Sciences Corporation II, Fairfax, Va.

[21] Appl. No.: 786,209

[22] Filed: Oct. 10, 1985

[51] Int. Cl.$^4$ .............................................. B64G 1/22
[52] U.S. Cl. ................................. 244/158 R; 410/49
[58] Field of Search ............... 244/158 R, 161, 118.1; 248/276, 288.3, 316.1, 633, 644, 670, 671, 677; 410/2, 47, 49

[56] References Cited

U.S. PATENT DOCUMENTS

| | | | |
|---|---|---|---|
| 3,071,269 | 1/1963 | Moulds, Jr. | 410/49 |
| 3,306,562 | 2/1967 | Bellefleur | 248/677 |
| 4,046,345 | 9/1977 | Boyd, Sr. | 248/316.1 |
| 4,082,240 | 4/1978 | Heathman et al. | 244/158 R |

FOREIGN PATENT DOCUMENTS 1243015  8/1971  United Kingdom ................ 248/633

Primary Examiner—Joseph F. Peters, Jr.
Assistant Examiner—Rodney Corl
Attorney, Agent, or Firm—Kirkland & Ellis

[57] ABSTRACT

A novel apparatus for supporting a payload in the cargo bay of a reusable space vehicle, like the orbiter of the NASA Space Transportation System (STS). In the preferred embodiment, a plurality of pad assemblies which are attached to a cradle located in the cargo bay of the orbiter. The pad assemblies are mounted at intervals along the inside surface of the cradle and can be adjusted in the radial direction by means of a screw adjustment. Each pad assembly comprises a pad covering, a rocker pad, and an alignment and adjustment apparatus. The pad covering is bonded to the rocker pad and makes a bearing connection with the payload. The pad covering comprises a plurality of elastomeric pads interleaved with metal sheets. The outer surface of the pad covering is shaped to accommodate a cylindrical payload. The rocker pad is attached to the cradle by means of the alignment and adjustment apparatus. That apparatus comprises a socket connector, threaded adjusting bar, lower key structure, a keeper and a cradle attachment bracket and bolts. The apparatus permits the pad assembly to be adjusted radially and longitudinally in order to properly position the pad assembly with respect to the payload.

10 Claims, 3 Drawing Sheets

SECTION A-A

FIG.3
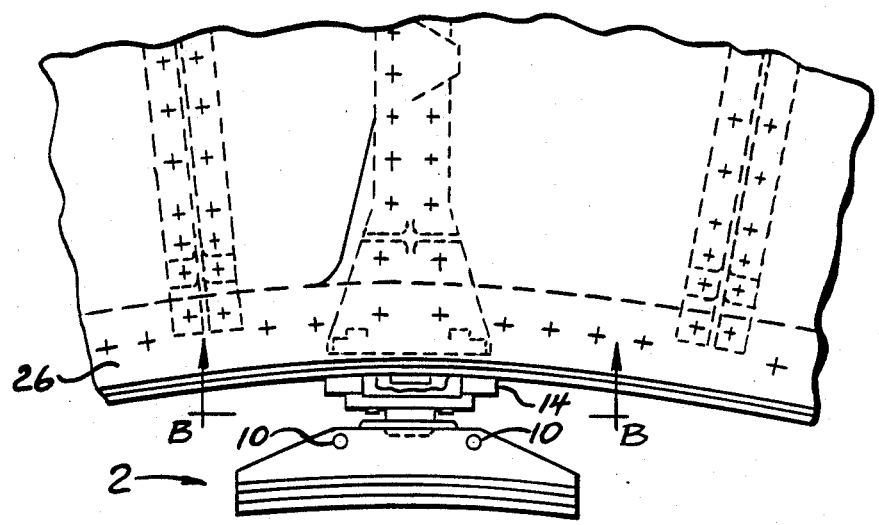
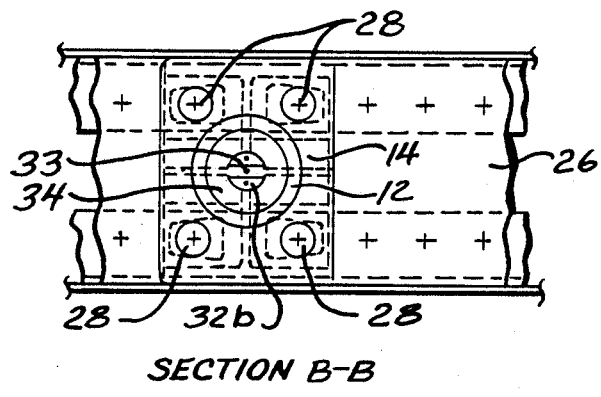
SECTION B-B
FIG.4

PAD APPARATUS FOR SUPPORTING A PAYLOAD IN A CRADLE APPARATUS OF A SPACE VEHICLE

BACKGROUND OF THE INVENTION

1. Field of the Invention

The present invention relates to a technique for supporting a payload in the cargo bay of a space vehicle. The payload is supported in part by a plurality of radially adjustable pads which are attached to a cradle assembly which is in turn attached to the frame of the space vehicle. Each pad includes an elastomeric covering whereby lateral loads are transferred from the payload to the cradle and to the frame of the space vehicle.

2. Brief Description of the Prior Art

The prior art discloses several techniques fior securing a payload to a cradle in the cargo bay of a space vehicle. In U.S. Pat. No. 4,044,974, for a "Closed Cradle Space Vehicle Support and Deployment System," issued on Aug. 30, 1077 to Lingley, et al., the cradle is attached to the spacecraft by two pairs of continuous, outwardly extending rings called continuous integrated normal clamping hook (CINCH) rings. One pair of rings is located at the forward edge f the spacecraft and the other at the aft end of the spacecraft. The CINCH rings are mounted on the inner surface of the cradle and mate with spacecraft interface rings that are located around the circumference of the spacecraft. The forward CINCH ring has a concave surface section which mates with a correspondingly shaped convex surface on the forward spacecraft interface ring. This connection reacts in longitudinal (X) and radial (Y,Z) directions. The aft CINCH ring has the shape of a trough. An aft spacecraft interface ring abuts against the aft CINCH ring and reacts against only radial (X,Y) loads.

While the use of continuous sectiions in the Lingley device helps to minimize the maximum moment which is transmitted to the cradle and permits some minor rotation of the payload, thus further reducing the design moment of the cradle, the Lingley device also has certain disadvantages. One disadvantage of the Lingley device is that the rings are designed for cylindrical payloads. If a payload is not cylindrical, e.g., square, special rings and a supporting structure must be fabricated for the cradle and the payload.

A second disadvantage is that the two continuous rings in the Lingley design generate extra weight. The weight added by the two rings which are attached to the payload which is to be deployed into space is especially undesirable.

A third disadvantage is that, while the Lingley design permits some rotation of the payload, it restricts forward and aft movement. This restriction increases the loads that are transferred to the cradle and necessitates a heavier cradle design.

In U.S. Pat. No. 4,290,570, issued on Sept. 22, 1981 to Smolik, et al, for a "Three Point Attachment For An Ejectable Spacecraft," a spacecraft is attached to a cradle at three points. Each connection is made by a bal and socket type connection. At two of the three points, the ball and socket connection is made by means of a locking mechanism attached to the cradle which drives a bar through holes in the ball and holes in the swivel joint which serves as a socket. At the third connecting point, the ball mounts into a locking mechanism which serves as the socket joint.

One disadvantage of the Smolik device is that locating all the connections between the payload and the cradle in a single plane limits the size of the payload. Heavier payloads require both forward and aft connections. Moreover, the locking mechanism and trunnion balls in the Smolik device add weight to the cradle and spacecraft, respectively, thus reducing the size of the payload. In addition, the use of only three connection points requires that the structure which transfers loads from the connection points to the orbiter be reinforced at those points. Additional connections between the spacecraft and the cradle would lessen those loads and reduce the size of the structure. Finally, the Smolik device is complex and may be difficult to install and operate.

Another support system is the design for the Inertial Upper Stage (IUS) prepared by Boeing. In the IUS, a payload consisting of an upper stage mated to a spacecraft is carried in the cargo bay of the orbiter of the NASA Space Transportation Systems (STS) by means of a tilting aft cradle and a forward U-shaped cradle. The payload is attached to the forward cradle by a pair of payload retention latch assemblies (PRLA). The PRLA are attached to the cradle by load levelers and the cradle is attached to the frame of the orbiter by low response hydraulic dampers. A motor driven gear train assembly in the PRLA closes a claw around a trunnion attached to the payload and seats the trunnion between a lower half spherical bearing and a top half spherical bearing in the PRLA.

The main disadvantage of the IUS device is that the moments generated by the movements of the spacecraft in the cradle are transferred to the cradle at only a few points. In order to resist these moments, the cradle structure must be reinforced at those points, creating additional weight. Another disadvantage of the IUS design is that it is complex because it requires the use of additional equipment e.g., dampers and load levelers. This equipment increases the weight of the cradle and the payload.

Accordingly, it is an object of the present invention to provide a means for attaching a relatively large payload to a cradle in a space vehicle.

It is a further object of the present invention to provide an attachment apparatus which transfers loads from the payload efficiently and effectively.

It is also an object of the present invention to provide a means for attaching a payload to the cradle of a space vehicle which minimizes the weight of the attachment apparatus.

SUMMARY OF THE INVENTION

The present invention provides a novel apparatus for supporting a payload in the cargo bay of a space vehicle, like the orbiter of the NASA Space Transportation System (STS).

The preferred embodiment includes a plurality of pad assemblies which are attached to a cradle located in the cargo bay of the orbiter. The pad assemblies are mounted at intervals along the inside surface of the cradle and can be adjusted in the radial direction by means of a screw adjustment. This adjustment allows the cradle to support spacecraft which are irregularly shaped as a result of design, manufacturing or environmental effects, without the need for redesign of the cradle itself. This adjustment also permits precise preloading of the payload prior to launch. Preloading values are calculated for each payload. Instrumentation can be utilized during assembly to verify that the load applied by the pad assemblies imposes the required preload.

Each pad assembly comprises a pad covering, a rocker pad, and an alignment and adjustment apparatus. The pad covering of the pad assembly makes a bearing connection with the payload. In the preferred embodiment, the pad covering itself comprises three, one-quarter inch thick elastomeric pads and interleaved metal sheets. The elastomeric pad is stiff in compression and flexible in shear with a low coefficient of friction, thereby permitting the spacecraft to rotate and to move longitudinally when the cradle is closed. In the preferred embodiment, the elastomeric pads are interleaved with two stainless steel sheets for added strength, and the outer surface of the pad covering is shaped to accommodate a cylindrical payload. The pad covering is then bonded to the rocker pad.

The interface between the rocker pad and pad covering and the cradle is provided by an alignment and adjustment apparatus. That apparatus comprises a socket connector, threaded adjusting bar, lower key structure, a keeper and a cradle attachment bracket and bolts. The apparatus permits the pad assembly to be adjusted radially and longitudinally in order to properly position the pad assembly with respect to the payload.

DESCRIPTION OF THE DRAWINGS

FIG. 3 is a side view of the pad assembly attached to the forward cradle;

FIG. 4 is a section view of the attachment of the pad assembly to the forward cradle taken along line B—B in FIG. 3.

DESCRIPTION OF THE PREFERRED EMBODIMENT

The preferred embodiment of the apparatus is set forth herein, for illustrative purposes, in connection with an orbiter of the NASA Space Transportation System (STS) which is equipped with an aft cradle and with a forward cradle of the type set forth in a copending application for a "Cradle Apparatus for Supporting Payloads in a Space Vehicle," filed on Oct. 10, 1985 as Ser. No. 786,212 by F. L. Byers, J. R. McCandless and G. W. Salt and assigned to the assignee of the present invention.

Figure 1:
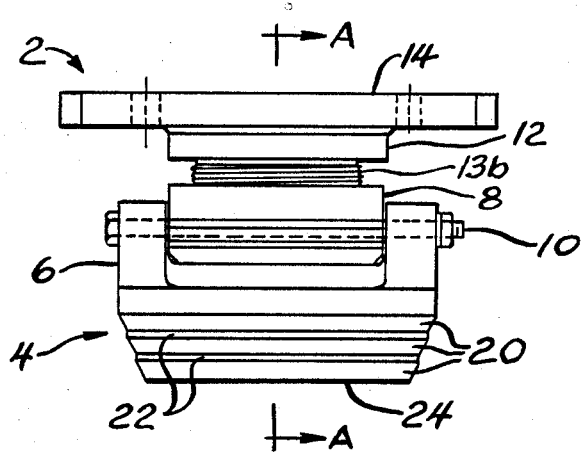
FIG. 1 is an end view of the pad assembly of the present invention taken in the direction of line C—C in FIG. 5.
Figure 2:
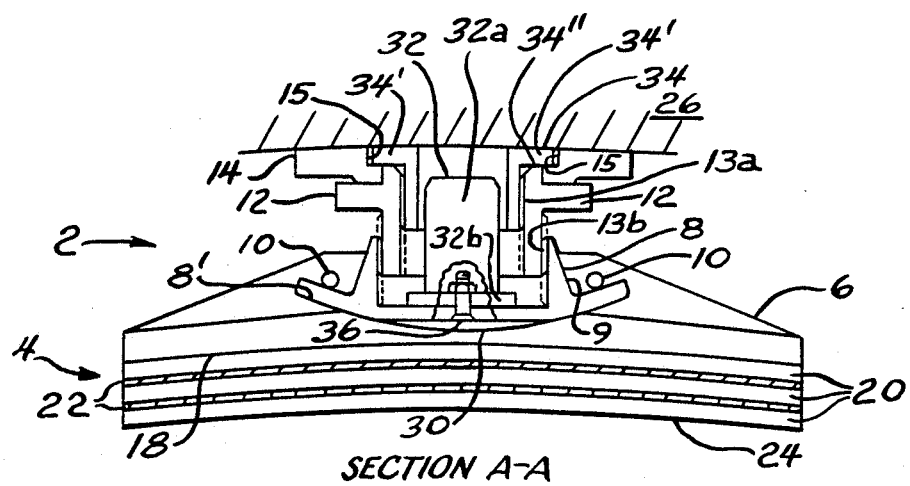
FIG. 2 is a section view of the pad assembly taken along line A—A in FIG. 1.

As shown in FIG. 1, a pad assembly 2 comprises a pad covering 4, a rocker pad 6, a radiused connector 8, connecting bolts 10, threaded adjusting screw 12 with threads 13 and cradle mounting bracket 14. As shown in FIG. 2, which is section A—A in FIG. 1, pad covering 4 is bonded to the inside surface 18 of rocker pad 6. In the preferred embodiment, the pad covering 4 comprises three one-quarter-inch thick elastomeric pads 20 interleaved with two stainless steel sheets 22.

Figure 5:
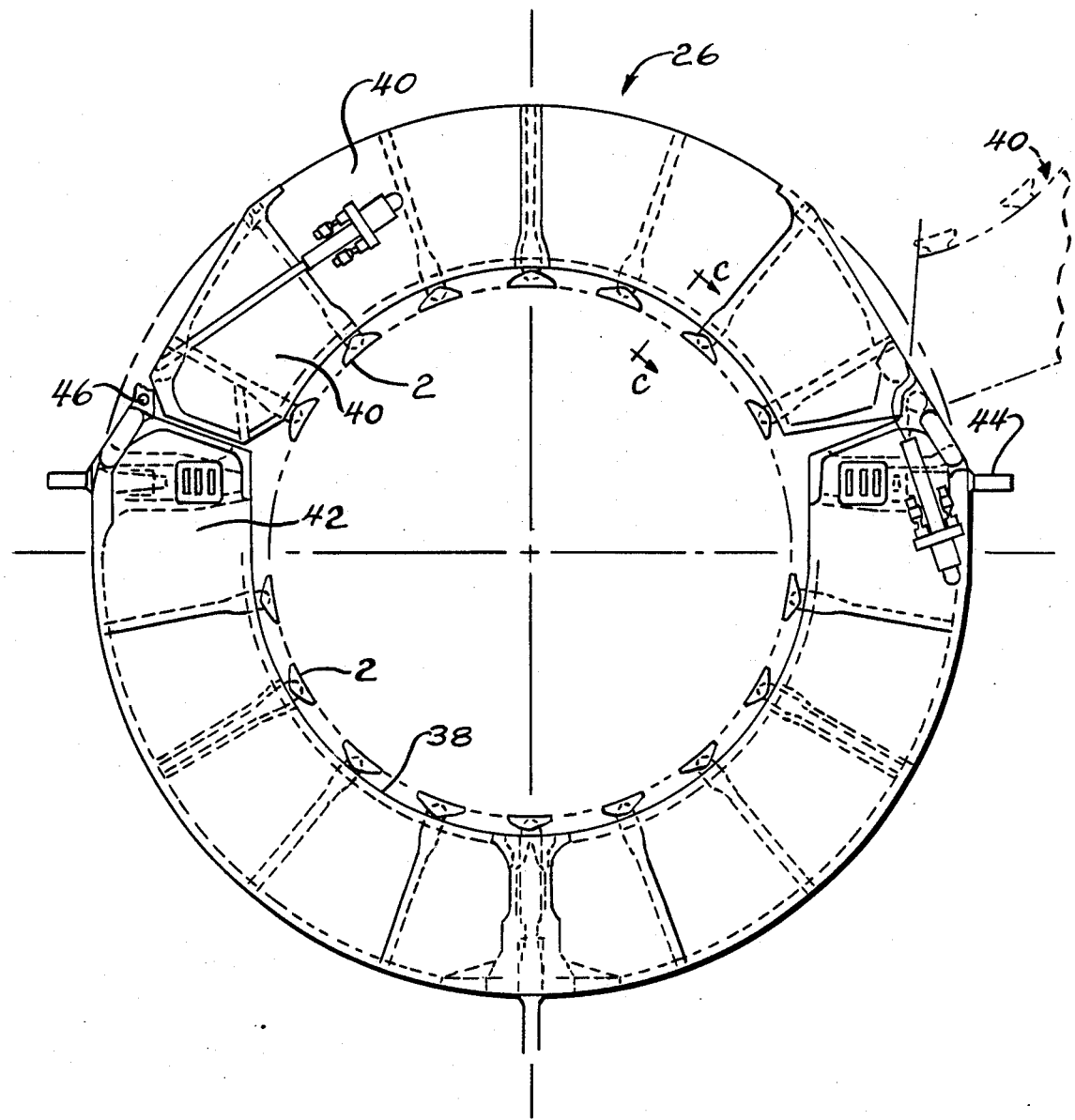
FIG. 5 is a forward looking, schematic view of a plurality of pad assemblies of the present invention mounted in the forward cradle.

In the preferred embodiment, the material used for the elastomeric pads 20 is a material, such as silicone rubber, which is stiff in compression and flexible in shear. These properties will permit the payload supported by the pad assemblies 2 to rotate slightly and to move slightly forward and aft within the cradle 26 (FIG. 5). Allowing these movements in turn reduces the moments transferred to the cradle 26, which allows the cradle 26 to be of a lighter-weight design. Also in the preferred embodiment, the outer bearing surface 24 of the pad assembly 2, which bears against the outer surface of the payload (not shown), is about five inches wide by ten inches deep and is shaped to accommodate a cylindrically-shaped payload.

As shown in FIG. 2, pad assembly 2 is secured to the forward cradle structure 26 by attachment of cradle mounting bracket 14 to forward cradle structure 26 by means of bolts 28 (see FIGS. 3-5 also). As shown in FIG. 2 cradle, mounting bracket 14 has a recess 15 into which the lip 34' of keeper structure 34 (shown in FIG. 2 in cross-section as an inverted "L" on either side) is inserted. A bearing engagement between lip 34' of keeper structure 34 and cradle mounting bracket 14 is provided when connecting bolts 28 (shown in FIG. 4) are tightened.

Also as shown in FIG. 2, adjusting screw 12 and keeper structure 34 are threadably connected by threads 13a. Radiused connector 8 and adjusting screw 12 are threadably connected by threads 13b. Connecting bolts 36 (only one of two such bolts being shown in FIG. 2) rigidly fastens base plate 32b of lower key structure 32 to the inside surface of radiused connector 8. Key member 33 (an end view of which is shown in FIG. 4) prevents radiused connector 8 and rocker pad 6 from rotating when the radial position of rocker pad 6 and the attached pad covering 4 is adjusted by rotation of adjusting screw 12 within radiused connector 8. As is apparent from FIGS. 2-5, rotation of rocker pad 6 while it is adjusted radially also can be prevented by interference between outer bearing surface 24 and the payload (not shown).

Rocker pad 6 is connected to radiused connector 8 by means of connecting bolts 10 (see FIGS. 1 and 2). Radiused surface 8' of radiused connector 8 slidably engages radiused surface 30 of rocker pad 6. As shown in FIG. 2, the radiused surface 8' of radiused connector 8 has a flat portion at its midsection, which provides clearance for the head of connecting bolt 36 with respect to radiused surface 30 of rocker pad 6.

Referring still to FIG. 2, radial adjustment of rocker pad 6, useful in accommodating payloads (not shown in FIG. 2) of varying dimensions, is accomplished by means of adjusting screw 12. Member 32a and base plate 32b slide within keeper structure 34 when the latter is rotated, thereby permitting radiused connector 8, which as noted is rigidly attached to base plate 32b by connecting bolt 36, to rotate with respect to adjusting screw 12 and cradle mounting bracket 14. Thus, rotation of adjusting screw 12 causes radial movement of radiused connector 8 along threads 13b toward or away from cradle structure 26 (upward or downward, respectively, in FIG. 2), thereby providing radial adjustment of rocker pad 6 with respect to the surface of the payload (not shown).

Longitudinal adjustment of rocker pad 6 with respect to the surface of the payload is provided by the bearing engagement of rocker pad 6 with radiused connector 8. As surface 24 of rocker pad 6 is brought into contact with the surface of the payload (not shown), rocker pad 6 can pivot by radiused surface 30 thereof sliding against the corresponding radiused surface 8' of radiused connector 8 to adjustably accommodate the surface of the payload (not shown). The pivoting of rocker pad 6 with respect to radiused connector 8 is limited by bolts 10, which abut the outer surface 9 of the stem of radiused connector 8 to limit the range of motion with respect to radiused connector 8 in either direction. Thus, the present invention provides radial and longitudinal adjustment of rocker pad 6 with respect to the surface of the payload (not shown).

As shown in FIGS. 3 and 4, the pad assembly 2 is attached to the forward cradle structure 26 by four bolts 28. In the preferred embodiment shown in FIG. 5, a total of sixteen pad assemblies 2 are mounted on the inside surface 38 of a forward cradle structure 26. Seven pad assemblies 2 are mounted on the upper hinged section 40 and nine pad assemblies 2 are mounted on the lower hinged section 42. The pad assemblies 2 are generally located at twenty degree intervals around the surface 38 except for gaps near the hinge point 44 and the latch point 46 of the forward cradle.

While a preferred embodiment of the invention has been illustrated and described, it is to be understood that the invention is not limited to the precise construction therein disclosed and the right is reserved to all changes and modifications coming within the scope of the invention as defined in the appended claims.

I claim:

1. An apparatus for supporting a payload in a cargo bay of a vehicle comprising:
a plurality of radially and laterally adjustable pad assemblies mounted on the inside circumference of a cradle mounted in the cargo bay, wherein each of said pad assemblies further comprises a rocker pad and an alignment and adjustment apparatus and wherein each of said rocker pads further comprises a pad covering affixed thereto, said pad coverings further comprising a plurality of elastomeric pads interleaved by metal sheets, wherein the surface of the pad covering that engages the outer surface of the payload is one of the elastomeric pads.

2. The apparatus as claimed in claim 1 wherein the elastomeric pads are constructed of silicone rubber.

3. The apparatus as claimed in claim 1 wherein the metal sheets are constructed of stainless steel.

4. The apparatus as claimed in claim 1 wherein the elastomeric pads and the metal sheets are formed to bearingly engage the outer surface of the payload.

5. An apparatus for providing radial support for a longitudinal flight vehicle payload comprising:
an annular cradle support member for receiving the flight vehicle payload through the opening therein; and
a plurality of pad means mounted at intervals around the interior of the opening in said cradle support member, wherein said pad means are stiff in compression and flexible in sheer.

6. The apparatus as claimed in claim 4 wherein each of said pad means further comprises:
at least two elastomeric layers; and
at least one rigid layer, wherein one of said rigid layers is positioned between each pair of said elastomeric layers.

7. The apparatus as claimed in claim 6 wherein said rigid layers are comprised of metal sheets.

8. The apparatus as claimed in claim 6 wherein said elastomeric layers are comprised of silicone rubber.

9. An apparatus for providing radial support for a longitudinal flight vehicle payload comprising:
an annular cradle support member for receiving the flight vehicle payload through the opening therein; and
a plurality of pad means mounted at intervals around the interior of the opening in said cradle support member, wherein each of said pad means further comprises:
a mounting bracket for attachment on one side to said annular cradle support member, said mounting bracket having an opening therein with a shoulder in the opening on the side of said mounting bracket opposite from said annular cradle member such that the opening is smaller in diameter adjacent the shoulder;
an annular keeper member mounted within the opening in said mounting bracket, said annular keeper member havin a lip extending radially outward on one end thereof, the lip being positioned between the shoulder of said mounting bracket and said annular cradle support member, said annular keeper member being configured such that there is a gap between said annular keeper member and said mounting bracket in the opening therein adjacent the shoulder of said mounting bracket, said annular keeper member having threads on the exterior thereof in the area between the lip and the end thereof opposite the lip;
an annular adjusting screw having threads on both the interior and the exterior thereof, the threads on the interior of said annular adjusting screw threadably engaging the threads on the exterior of said annular keeper member, one end of said annular adjusting screw being configured to occupy the gap between said annular keeper member and the shoulder of said mounting bracket and to abut against the lip on said annular keeper member, the shoulder of said mounting bracket, and the exterior of said annular keeper member, thereby rigidly securing said annular keeper member and said annular adjusting screw to said annular cradle support member;
a radiused connector member having an opening in one end thereof with threads on the interior surface of the opening for threadably engaging the threads on the exterior of said annular adjusting screw; and
a rocker pad for engaging the flight vehicle payload, said rocker pad being attached to the end of said radiused connector member opposite from the end with the opening therein.

10. The apparatus as claimed in claim 9 wherein the end of said radiused connector member opposite from the end with the opening therein has a flange member on either side thereof and wherein said rocker pad is pivotably attached to said radiused connector member by a pair of bolt means, each of said bolt means slidably engaging a respective flange member of said radiused connector member.

* * * * *